US007824267B2

(12) United States Patent
Cannon et al.

(10) Patent No.: US 7,824,267 B2
(45) Date of Patent: Nov. 2, 2010

(54) METHOD AND APPARATUS FOR GAMING MACHINES WITH A TOURNAMENT PLAY BONUS FEATURE

(75) Inventors: Lee E. Cannon, Bozeman, MT (US); Mick D. Roemer, Las Vegas, NV (US); Robert Guinn, Henderson, NV (US); Michael J. Mitchell, Las Vegas, NV (US)

(73) Assignee: IGT, Reno, NV (US)

( * ) Notice: Subject to any disclaimer, the term of this patent is extended or adjusted under 35 U.S.C. 154(b) by 1451 days.

(21) Appl. No.: 11/093,325

(22) Filed: Mar. 29, 2005

(65) Prior Publication Data

US 2005/0181856 A1 Aug. 18, 2005

Related U.S. Application Data

(63) Continuation of application No. 10/867,940, filed on Jun. 14, 2004, now abandoned, which is a continuation of application No. 09/864,927, filed on May 24, 2001, which is a continuation-in-part of application No. 09/675,829, filed on Sep. 29, 2000, now abandoned.

(51) Int. Cl.
*A63F 9/24* (2006.01)
*A63F 13/00* (2006.01)

(52) U.S. Cl. ................................ 463/42; 463/9; 463/11; 463/16; 463/20; 463/25; 700/91; 700/92; 340/323 R

(58) Field of Classification Search ........................ None
See application file for complete search history.

(56) References Cited

U.S. PATENT DOCUMENTS

| | | | |
|---|---|---|---|
| 4,114,882 | A | 9/1978 | Mau |
| 4,339,798 | A | 7/1982 | Hedges et al. |
| 4,373,727 | A | 2/1983 | Hooker et al. |
| 4,440,036 | A | 4/1984 | Hooker et al. |
| 4,508,345 | A | 4/1985 | Okada |
| 4,582,324 | A | 4/1986 | Koza et al. |
| 4,669,731 | A | 6/1987 | Clarke |
| 4,679,143 | A | 7/1987 | Hagiwara |
| 4,695,053 | A | 9/1987 | Vazquez, Jr. et al. |

(Continued)

FOREIGN PATENT DOCUMENTS

EP 0609970 8/1994

(Continued)

OTHER PUBLICATIONS

Take Your Pick, Strictly Slots (Mar. 2001).

(Continued)

*Primary Examiner*—M. Sager
(74) *Attorney, Agent, or Firm*—Armstrong Teasdale LLP

(57) ABSTRACT

A tournament gaming system is disclosed including one or more gaming machines programmed for play of at least one tournament game. A plurality of gaming machines may be linked for tournament play by a host computer. Qualification for tournament play is based only upon criteria established only by the gaming operator or without consideration of player desire to participate in the tournament. Game play on at least some of the participating games is tracked and displayed during the tournament, which ends after a player of one of the games achieves predetermined results.

21 Claims, 3 Drawing Sheets

U.S. PATENT DOCUMENTS

| | | | |
|---|---|---|---|
| 4,817,951 A | 4/1989 | Crouch et al. | |
| 4,837,728 A | 6/1989 | Barrie et al. | |
| 4,856,787 A | 8/1989 | Itkis | |
| 4,871,171 A | 10/1989 | Rivero | |
| 5,083,271 A | 1/1992 | Thacher et al. | |
| 5,152,529 A | 10/1992 | Okada | |
| 5,186,460 A | 2/1993 | Fongeallaz et al. | |
| 5,242,163 A | 9/1993 | Fulton | |
| 5,265,874 A | 11/1993 | Dickinson et al. | |
| 5,275,400 A | 1/1994 | Weingardt et al. | |
| 5,288,081 A | 2/1994 | Breeding | |
| 5,290,033 A | 3/1994 | Bittner et al. | |
| 5,393,057 A | 2/1995 | Marnell, II | |
| 5,397,125 A | 3/1995 | Adams | |
| 5,417,430 A | 5/1995 | Breeding | |
| 5,472,197 A | 12/1995 | Gwiasda et al. | |
| 5,544,892 A | 8/1996 | Breeding | |
| 5,560,603 A | 10/1996 | Seelig et al. | |
| 5,564,701 A | 10/1996 | Dettor | |
| 5,580,309 A | 12/1996 | Piechowiak et al. | |
| 5,611,730 A | 3/1997 | Weiss | |
| 5,645,486 A | 7/1997 | Nagao et al. | |
| 5,655,961 A | 8/1997 | Acres et al. | |
| 4,856,787 A | 9/1997 | Itkis | |
| 5,664,998 A | 9/1997 | Seelig et al. | |
| 5,758,875 A | 6/1998 | Giacalone, Jr. | |
| 5,761,647 A | 6/1998 | Boushy | |
| 5,768,382 A * | 6/1998 | Schneier et al. | 380/251 |
| 5,769,716 A | 6/1998 | Saffari et al. | |
| 5,779,242 A | 7/1998 | Kaufmann | |
| 5,779,544 A | 7/1998 | Seelig et al. | |
| 5,779,549 A | 7/1998 | Walker et al. | |
| 5,806,045 A | 9/1998 | Biorge et al. | |
| 5,816,918 A | 10/1998 | Kelly et al. | |
| 5,820,460 A | 10/1998 | Fulton | |
| 5,823,874 A | 10/1998 | Adams | |
| 5,833,536 A | 11/1998 | Davids et al. | |
| 5,851,148 A | 12/1998 | Brune et al. | |
| D404,436 S | 1/1999 | McGahn et al. | |
| 5,855,515 A | 1/1999 | Pease et al. | |
| 5,876,284 A | 3/1999 | Acres et al. | |
| 5,882,260 A * | 3/1999 | Marks et al. | 463/42 |
| 5,902,184 A | 5/1999 | Bennett | |
| 5,902,983 A | 5/1999 | Crevelt et al. | |
| 5,911,418 A | 6/1999 | Adams | |
| 5,919,088 A | 7/1999 | Weiss | |
| 5,924,927 A | 7/1999 | Matsuura et al. | |
| 5,935,000 A | 8/1999 | Sanchez, III et al. | |
| 5,941,772 A | 8/1999 | Paige | |
| 5,947,820 A | 9/1999 | Morro et al. | |
| 5,951,397 A | 9/1999 | Dickinson | |
| 5,976,015 A | 11/1999 | Seelig et al. | |
| 5,980,384 A | 11/1999 | Barrie | |
| 5,993,316 A | 11/1999 | Coyle et al. | |
| 5,997,400 A | 12/1999 | Seelig et al. | |
| 6,012,982 A | 1/2000 | Piechowiak et al. | |
| 6,012,983 A | 1/2000 | Walker et al. | |
| 6,015,344 A | 1/2000 | Kelly et al. | |
| 6,019,374 A | 2/2000 | Breeding | |
| 6,039,648 A | 3/2000 | Guinn et al. | |
| 6,077,162 A | 6/2000 | Weiss | |
| 6,082,887 A | 7/2000 | Feuer et al. | |
| 6,089,975 A | 7/2000 | Dunn | |
| 6,089,976 A | 7/2000 | Schneider et al. | |
| 6,102,400 A | 8/2000 | Scott et al. | |
| 6,110,043 A | 8/2000 | Olsen | |
| 6,113,098 A | 9/2000 | Adams | |
| 6,120,378 A | 9/2000 | Moody et al. | |
| 6,128,550 A | 10/2000 | Heidel et al. | |
| 6,135,885 A | 10/2000 | Lermusiaux | |
| 6,146,273 A | 11/2000 | Olsen | |
| 6,159,095 A | 12/2000 | Frohm et al. | |
| 6,159,097 A | 12/2000 | Gura | |
| 6,165,071 A | 12/2000 | Weiss | |
| 6,165,072 A | 12/2000 | Davis et al. | |
| 6,168,521 B1 | 1/2001 | Luciano et al. | |
| 6,186,893 B1 | 2/2001 | Walker et al. | |
| 6,190,255 B1 | 2/2001 | Thomas et al. | |
| 6,193,606 B1 | 2/2001 | Walker et al. | |
| 6,203,010 B1 | 3/2001 | Jorasch et al. | |
| 6,206,782 B1 | 3/2001 | Walker et al. | |
| 6,210,275 B1 | 4/2001 | Olsen | |
| 6,210,277 B1 | 4/2001 | Stefan | |
| 6,224,482 B1 | 5/2001 | Bennett | |
| 6,224,484 B1 | 5/2001 | Okuda et al. | |
| 6,224,486 B1 | 5/2001 | Walker et al. | |
| 6,231,445 B1 | 5/2001 | Acres | |
| 6,238,287 B1 | 5/2001 | Komori et al. | |
| 6,287,202 B1 | 9/2001 | Pascal et al. | |
| 6,309,299 B1 | 10/2001 | Weiss | |
| 6,309,307 B1 | 10/2001 | Krause et al. | |
| 6,315,662 B1 | 11/2001 | Jorasch et al. | |
| 6,364,765 B1 | 4/2002 | Walker et al. | |
| 6,375,567 B1 | 4/2002 | Acres | |
| 6,425,828 B2 | 7/2002 | Walker et al. | |
| 6,508,709 B1 | 1/2003 | Karmarkar | |
| 2002/0039923 A1 | 4/2002 | Cannon et al. | |
| 2002/0177483 A1 | 11/2002 | Cannon | |
| 2003/0060264 A1 | 3/2003 | Chilton et al. | |

FOREIGN PATENT DOCUMENTS

| | | |
|---|---|---|
| EP | 0874337 | 10/1998 |
| EP | 0945837 | 9/1999 |
| EP | 0984407 | 3/2000 |
| WO | WO 98/00210 | 1/1998 |
| WO | WO 00/20082 | 4/2000 |
| WO | WO 02/096528 | 12/2002 |

OTHER PUBLICATIONS

Instant Sloto, Strictly Slots (Apr. 2001).
EZ-Pay and Related Brochures, IGT (2000).
Player Tracking and Related Brochures, IGT (at least 2001).
Raining Diamonds Advertisement, Sierra Design Group (2001).
Silver Strike Advertisement and Pictures, Anchor Gaming (1997).
Simon & Schuster, Scarne's New Complete Guide to Gambling (USA, 1974).

* cited by examiner

METHOD AND APPARATUS FOR GAMING MACHINES WITH A TOURNAMENT PLAY BONUS FEATURE

This application is a continuation of application Ser. No. 10/867,940, filed Jun. 14, 2004, now abandoned which is a continuation of application Ser. No. 09/864,927, filed May 24, 2001, which is a continuation-in-part of application Ser. No. 09/675,829, filed on Sep. 29, 2000 now abandoned. This application is also a continuation of application Ser. No. 09/864,927, filed May 24, 2001, which is a continuation-in-part of application Ser. No. 09/675,829, filed on Sep. 29, 2000.

BACKGROUND OF THE INVENTION

1. Field of the Invention

The present invention relates generally to gaming system designs including a tournament feature. More particularly, the present invention may include a gaming system having two or more electronic or electromechanical gaming machines in common communication, the gaming machines providing a each player an opportunity to enter and play a tournament game at each player's current location rather than at another, specific location designated for tournament play. A player may qualify for entry into a tournament in various ways, such as, for example, through achieving predetermined combinations of elements or scores on the gaming machine in a single base or primary game or in multiple games over time, wagering a predetermined amount or at a predetermined rate, or collecting a predetermined number of tournament entry points from play of primary games. Participation in a tournament after qualification may be, at the player's option, deferred until a later time.

2. State of the Art

Electronic games and their methods and apparatus for use are also well known in the art. Electronic games include games of chance, games of skill, and games involving both skill and chance. Examples of several patents describing games of chance include U.S. Pat. No. 5,833,536 to Davids et al. (Nov. 10, 1998), the disclosure of which is hereby incorporated herein by reference, U.S. Pat. No. 5,769,716 to Saffari et al. (Jun. 23, 1998), U.S. Pat. No. 5,820,460 to Fulton (Oct. 13, 1998) and U.S. Pat. No. 5,947,820 to Morro et al. (Sep. 7, 1999).

FIG. 1 is a block diagram of an exemplary electronic game 200 as found in the art. An electronic game 200 typically includes a microprocessor or other computer 204 having a central processing unit ("CPU") 206 and memory 208. The computer may be coupled to a number of peripheral devices such as, by example only, a display screen 210 (e.g., a cathode ray tube ("CRT"), plasma display, liquid crystal display ("LCD"), and/or a display based on light emitting diodes ("LED")), possibly having a touchscreen input 212 (see U.S. Pat. No. 5,951,397 to Dickinson (Sep. 14, 1999)), and/or buttons, keys or other user input devices 214. Preferably a coin, currency or card acceptor device 216 (to accept a credit card, gaming card, smart card and the like) permits a player to activate a game play or place wagers. The electronic game may also include a separate scoreboard display 218.

Electronic games may also be coupled to one or more other computers such as a central computer 220 of a casino, e.g. via a network card 222 and link 224, modem 226 and the like. The game parameters 228, such as how, when and where particular images will appear on the display screen 210, how the game works and how to operate the various elements operably coupled to the computer 204, are stored in the memory 208. The electronic game 200 may be housed in a game housing 202 such as, by example only, those shown in U.S. Pat. No. 5,820,460 to Fulton (Oct. 13, 1998) and Des. 404,436 to McGahn et al. (Jan. 19, 1999).

Initiating an electronic game can be done as simply as by inserting a coin or, more comprehensively, for example, by inserting an identification card, such as a "smart card" having a programmed microchip or a magnetic strip coded with a player's identification and credit totals. See U.S. Pat. No. 5,265,874 to Dickinson et al. (Nov. 30, 1993), the disclosure of which is hereby incorporated herein by reference. U.S. Pat. No. 5,806,045 to Biorge et al. (Sep. 8, 1998) uses a writeable identification card, such as a smart card to eliminate the need for a network or direct connection between remote systems and a common controller or point database. Promotional point and credit information may be retrieved, recorded and updated using the smart card. Alternatively, it is known to transfer money to a game through an electronic funds transfer as described in U.S. Pat. No. 5,902,983 to Crevelt et al. (May 11, 1999).

Existing electronic game displays typically include multiple images representing various aspects of a game such as a game portion, a credit total portion and a wager amount portion. Other electronic game displays include an additional bonus award portion to indicate an amount of a bonus award which may be won, typically through multiple games. See U.S. Pat. No. 5,851,148 to Burne et al. (Dec. 22, 1998) and U.S. Pat. No. 5,911,418 to Adams (Jun. 15, 1999).

The Internet also includes casino or game host sites offering displays similar to those found in conventional electronic games. Generally, to play an Internet game, a software file is downloaded to a player's computer or terminal, which may then be used to install the necessary software for the game and/or access the casino or game host Internet site. As with a conventional electronic game, Internet electronic games may be accessed using an identification code or name to identify a specific player and retrieve that player's credit total or play history.

Gaming tournaments, conventional methods and operation of which are well known to those of ordinary skill in the art, are typically held by casinos at specified times, in designated areas within the casino to which a group of gaming machines has been moved for the purpose of conducting a tournament, and for specified durations. Tournament players are conventionally required to pay an entry fee to enter the tournament, although no wagers are made during the tournament. The accumulated points totals for successful tournament play, although couched in monetary terms, do not generally comprise the amounts of the actual prizes awarded. Accordingly, the "money" won is not actually paid out, but tournament players with the highest accrued totals of "money" at the end of the tournament are the winners. These winners may be conventionally awarded a percentage of the entry fees, or other prizes, by the sponsor or sponsors of the tournament.

One example of a gaming tournament system and method of entering a gaming tournament is disclosed in U.S. Pat. No. 6,019,374 to Breeding. The Breeding patent discloses a playing card wagering game to be played at predetermined tournament card game tables during a specified time. In the Breeding patent card game, players place a wager and are then permitted to place a second wager and entry fee for the opportunity to participate in a tournament game. In one embodiment, for example, players may elect to pay a $1 entry fee per hand to participate in the tournament. If a player pays the entry fee and gets a straight or better, the player's hand is eligible and may qualify the player for the second round of the tournament during a second predetermined time if the player's hand is in the top one hundred eligible hands obtained during the specified tournament time. For the tournament disclosed in the Breeder patent, there are five tournament rounds. At each round, the number of players eligible for a succeeding round is reduced and play continues until only five players are left in the final round. The players are then ranked by the total amounts accumulated in the final round and awards paid accordingly from a super jackpot total. See also, U.S. Pat. Nos. 5,288,081, 5,417,430 and 5,544,892, all to Breeding.

Although conventional tournament opportunities encourage protracted gaming and add variety to a player's gaming experience, administration of conventional gaming tournaments is time consuming and relatively expensive. As a result, tournament play is offered only at particular times and places most convenient for the tournament coordinators to allow sufficient time for tournament organization activities such as qualifying participants, sectioning-off a portion of the casino, rearranging gaming machine or table locations, and the like.

U.S. Pat. No. 5,083,271 to Thacher et al. discloses a method of tracking tournaments for electronic games in which scores achieved on the games are transmitted to one or a hierarchy of computers, which determine a winner or winners. Player codes are stored in association with player credits. The players insert credit cards into the gaming machines, which read the player codes, send the codes to a computer which verifies each player's identity and enables the gaming machines. The disclosure of U.S. Pat. No. 5,083,271 is hereby incorporated herein by reference.

U.S. Pat. No. 5,242,163 to Fulton discloses the linking of a plurality of gaming machines to a "control station" to at least announce commencement of play of a secondary, group-oriented game to players at distributed gaming machines normally used for play of another, individually oriented game, such as stud poker. The invention of the '163 patent is specifically disclosed in the context of providing the opportunity for individual players to participate in a bingo game without leaving their gaming machines. The bingo game may be conducted manually, using a bingo card secured to the gaming machine, or may be conducted through the gaming machine itself, linked to the control station.

U.S. Pat. No. 6,039,648 to Guinn et al. discloses the linking of a plurality of gaming machines to a host computer so that gaming machines at distributed locations may be employed in tournament play. The disclosure of U.S. Pat. No. 6,039,648 is hereby incorporated herein by reference.

While the concept of linking distributed gaming machines to facilitate initiation of group-oriented gaming from the distributed gaming machines has thus been recognized, it would be desirable to provide a tournament gaming system which is easily initiated and invites qualification for tournament play through enhanced participation in a base or primary game by a player located at a gaming machine convertible for tournament play.

BRIEF SUMMARY OF THE INVENTION

The present invention relates to a method and apparatus for gaming machines including a tournament play bonus feature. The gaming machines of the present invention are each configured having the features of a conventional gaming machine, but include additional features relating to tournament play, which features allow a player to participate in a gaming tournament from a gaming machine configured according to the invention regardless of the geographical location of the gaming machine.

According to one embodiment of the invention, a tournament event feature is incorporated within a traditional video or mechanical reel gaming machine in addition to a base or primary game. Play at a plurality of such gaming machines is computer-monitored centrally through a network system. Play of primary or base games at the plurality of gaming machines is employed to fund payouts for a tournament enabled for play by qualified players at linked gaming machines. No separate entry fee or buy in for tournament play is employed.

The linked gaming machines are provided with features which "qualify" players into a scheduled, linked, tournament event through attainment of one or more game outcome events. Normally, a player may qualify into the next-in-time scheduled, linked, tournament event. However, a player may be provided the option, once qualification parameters are met, to defer tournament play to a future tournament event in certain circumstances.

In tournament play according to this embodiment of the invention, each linked gaming machine generates game results and accumulates tournament points based on tournament game outcomes. The linked gaming machines each report to a central monitoring computer, which may be termed a tournament controller, which determines if each player meets criteria for an additional payout. Depending upon game outcomes in tournament play and the number of participants, payout awards are established and displayed.

The first embodiment of the invention may also incorporate a linked progressive wherein the very highest award is triggered by attaining an extremely high value of points during linked tournament play. This top progressive award may be set to correspond to a tournament point total requiring several rounds of tournament play before being paid out. Such a progressive may be enabled through a wide area progressive (WAP), multi-property linked progressive which may reach very large top payout amounts, thus attracting greater interest for players in qualifying into the linked tournament events.

The above-described embodiment of the invention comprises merely one implementation of the present invention, which embodies a number of aspects relating to various different elements of the tournament game of the present invention.

According to a first aspect of the present invention, a display of a gaming machine includes elements enabling and identifying the gaming machine's configuration for tournament play. According to a first embodiment of the first aspect, a gaming machine configured for tournament play includes a banner, a symbol or other identifying mark indicating that the gaming machine is configured for such tournament play. The identifying mark may be displayed on the gaming machine's housing, video display, or elsewhere on or near the gaming machine, such as above a bank of gaming machines configured according to the present invention. In a second embodiment of the first aspect, a video display on or associated with the gaming machine may further include a display segment indicating a player's present ranking among tournament players, the time remaining in the present tournament and/or the time remaining until the next tournament begins. In a third embodiment of the first aspect, the video display may further include a display segment indicating a player's potential for eligibility for playing in a particular tournament such as the number of tournament bonus credits or entry accrued versus those required, a displayed invitation to join a particular tournament, or other indication that the player may qualify, is qualified or is actually entered into a particular tournament.

According to a second aspect of the present invention, numerous methods may be employed for entering a tournament. In a first embodiment of the second aspect, a player may enter or be entered in a tournament in response an outcome of a single, primary game, such as obtaining a particular winning combination or other specific game outcome deserving of a bonus in the form of tournament entry. In a second embodiment of the second aspect, a player may accrue numbers of tournament bonus credits responsive to an outcome of one or more primary games outcomes and use the tournament bonus credits, alone or in combination with tendered monetary credits, as an entry fee to gain entry into a tournament. In a third embodiment of the second aspect, a player may enter a tournament by paying an entry fee by tendering credits at the gaming machine. In a fourth embodiment of the second aspect, qualification for entry into a gaming tournament is determined in accordance with a player's activities at a particular gaming machine or within a gaming establishment or group of affiliated establishments such as, for example, the total amounts wagered, or the number of games played, over time. Other, non-gaming activities may also be credited toward tournament qualification such as, for example, lodging or dining at the establishment hosting the tournament, purchasing at retail shops, engaging spa services, etc. In this fourth embodiment, for example, multiple, commonly owned or otherwise affiliated gaming establishments may each include gaming machines configured for tournament play and placed in communication with a common central controller such that players at each of the participating gaming establishments may enter a common tournament or series of tournaments and/or have activities at each of the participating gaming establishments count toward entry into a tournament common to those establishments. In other embodiments of this second aspect of the invention, the bonus tournament credits and/or the qualifying activities at a particular gaming machine may be associated with and accrue to the actions of a particular, identified player, or may accrue in association with a particular gaming machine regardless of which player generates which portion of the total bonus tournament credits. In yet other embodiments of this second aspect of the invention, the bonus tournament credits and/or activities at a particular gaming machine are associated with a particular gaming machine in continuous play (i.e., with minimal intervals between primary games) and are deleted from an idle machine. Alternatively, the bonus tournament credits may accrue to a specific, identified player and tied to a particular gaming machine at which he or she plays one or more primary games, the bonus tournament credits being deleted if that play leaves that gaming machine prior to qualifying for a tournament or, optionally, prior to qualifying and playing in the tournament.

According to a third aspect of the present invention, numerous methods and approaches may be employed to initiate or trigger a tournament. In a first embodiment of the third aspect, a tournament may be programmed to begin at regular or random intervals, or according to a specific, predetermined schedule. As noted above, with such an approach, pre-qualified players may enter based upon accrued bonus tournament credits alone, or in combination with tendered monetary credits if a shortfall exists, or by purchase of an entry at a suitably configured and communicating gaming machine. In a second embodiment of the third aspect, a tournament may begin automatically when a sufficient number of qualifying entries (i.e., qualified players) are present at suitably configured, communicating gaming machines. If a stand-alone gaming machine includes a tournament feature according to the invention, a player may initiate a tournament as soon as sufficient tournament entry points are accrued, by tendering a sufficient number of entry points previously banked, for example, using a smart card, or by other method not tied to participation of additional players.

According to a fourth aspect of the present invention, players may be provided the option as to whether or not to enter a tournament when first qualifying or to accrue additional tournament bonus credits. In a first embodiment of the fourth aspect, a player may be automatically entered into a particular (for example, the next in time) tournament or, optionally, queried as whether the player desires to enter the next tournament, upon accruing a sufficient number of tournament bonus credits. In a second embodiment of the fourth aspect, a player possessing a sufficient number of tournament bonus credits and playing an appropriately configured gaming machine at the time a tournament is scheduled to begin may either be automatically entered into that tournament or queried whether the player wants to join that tournament. In a third embodiment of the fourth aspect and in order to stimulate tournament play, additional tournament bonus credits do not accrue further to a player once a number of bonus tournament credits sufficient to enter a tournament has accrued. In a fourth embodiment of the fourth aspect, additional tournament bonus credits continue to accrue even after sufficient credits for entry have accrued to permit a player to enter a later tournament or possibly submit multiple entries to a single tournament. In a variation of the fourth embodiment, the tournament bonus credits may be transferred in a block by the gaming machine or tournament system when a sufficient number has accrued and converted into a tournament entry "token" in the form of, for example, the aforementioned entry ticket while additional credits may or may not continue to accrue. With this variation, the tournament entry tokens may be programmed for validity throughout a limited, predetermined time (for example, 12 hours) to stimulate usage thereof by the player.

According to a fifth aspect of the present invention, a tournament duration may be fixed or variable, and may also be based on the playing of a predetermined number of games, wagering a predetermined number of credits, or achieving at least a predetermined level of winnings.

According to a sixth aspect of the present invention, a tournament game may follow different game parameters from the primary game associated therewith. A tournament game may be the same as, a variation of, or an entirely different from the primary game. For example, a gaming machine on which a player may play a card game as a primary game may include a slot machine tournament game, or vice versa. In this way, gaming machines having a variety of primary games may participate in an identical game for the tournament. Furthermore, a tournament game may have the same payback ratio as a primary game or a different payback ratio.

According to a seventh aspect of the present invention, the conditions on the tournament awards may be adjusted. Awards for tournament play may be against fixed conditions, independent of other players, such as obtaining a particular winning combination, or may be against varied conditions which compete with other players, such as competing for the highest number of points. Awards may be set to correspond to a high number of tournament points accrued over a plurality of tournament sessions. Award amounts may be fixed amounts, progressive amounts, or pari-mutual amounts. If multiple entries to a tournament by an individual player are permitted, award amounts may be adjusted such as, by way of example only, by doubling the award if two entries are placed. Embodiments may include a guaranteed minimum award to all entrants to a tournament, and tournament awards may be posted to the winning players' credit meters, paid directly by an attendant, or both options may be provided. Separate from accrual for entry into individual tournaments, accumulation of tournament bonus credits may be tracked and grand tournament awards granted or bonus grand tournaments entered in accordance with overall tournament bonus credits accrued and used over a predetermined time period, such as a week. Such tracking may be accomplished through each players' player tracking account. Tournament bonus credits may also be associated with a particular gaming machine to award special bonus awards in response to the particular gaming machine reaching a predetermined total number of tournament bonus credits awarded over a preset time period. Alternatively, entry into a particular tournament may randomly be awarded.

According to an eighth aspect of the present invention, progressive and/or pari-mutuel tournament games may be played.

According to a ninth aspect of the present invention, players may be provided with an option to make multiple entries into a given tournament. In embodiments where multiple entries are permitted, many variations of multiple entries are contemplated. In a first embodiment of the ninth aspect, multiple entries by a player may enter the player into multiple tournament games which may be played simultaneously. The multiple simultaneous tournament games may be graphically (as by video screen) displayed as smaller versions of a standard tournament game, each smaller version operating independent of the other versions. In a second embodiment of the ninth aspect, multiple entries by a player may permit the player to qualify for a different selection of tournament awards such as larger award amounts, or lower thresholds or criteria for winning the awards. In a third embodiment of the ninth aspect, multiple entries by a player may adjust the tournament game such as by altering the award amounts, replacing various elements of the game to adjust the odds of winning, and/or varying the award categories. In a fourth embodiment of the ninth aspect, a player may be granted additional play time or a greater starting tournament point account balance for making multiple entries.

In a tenth aspect of the present invention, unredeemed bonus tournament credits may alternatively be left on a gaming machine for use by a subsequent player, converted to a cash award, wagered on the gaming machine to win enough additional bonus tournament credits for a tournament entry or other award, retained by the player for application to additional bonus tournament credits for tournament qualification, or reset to zero when the player leaves the gaming machine.

In an eleventh aspect of the present invention, a tournament may be funded by a number of various sources. In a first embodiment of the eleventh aspect, each bonus tournament credit awarded has associated with it a value and the tournament is funded by the value of the entry credits surrendered in exchange for entering the tournament. In a second embodiment of the eleventh aspect, a tournament is funded by a percentage of the amounts wagered during primary game play at the gaming machines configured for tournament play. In a third embodiment of the eleventh aspect, a tournament sponsor associated with, or separate from, the gaming venue may provide fixed amount or other prizes to fund the tournament awards. Other tournament funding methods are generally well known in the art and are contemplated as being used in accordance with the principles of the present invention.

In a twelfth aspect of the present invention, a gaming machine may include a display or a display segment including a recent play history for that machine. For example, one or more of the following may be displayed: length of time since last jackpot, size of last jackpot, frequency of jackpots, jackpot trends, or other win information. Depending upon a given player's personality and preferences, a player might be drawn to a given gaming machine because it has not recently paid out and is thus "due to hit", or has paid out in the recent past and is thus on a "hot streak".

In a thirteenth aspect of the present invention, in a multi-game video gaming machine, "prize profile" icons may be associated with and displayed adjacent each game name on the display. Each game prize profile, such as frequent small jackpots, fewer midrange jackpots or still fewer large jackpots is associated with a particular icon. Thus, players may quickly come to associate an icon with a type of game which appeals to them from a payout standpoint.

Various combinations of the aforementioned aspects of this invention are described further in detail hereafter. As one of ordinary skill in the art will understand, numerous combinations of these aspects are possible, and those provided are for illustrative and exemplary purposes only and are not in any way limiting the present invention.

BRIEF DESCRIPTION OF THE DRAWINGS

The nature of the present invention as well as other embodiments of the present invention may be more clearly understood by reference to the following detailed description of the invention, to the appended claims, and to the several drawings herein, wherein:

DETAILED DESCRIPTION OF THE INVENTION

Figure 1:
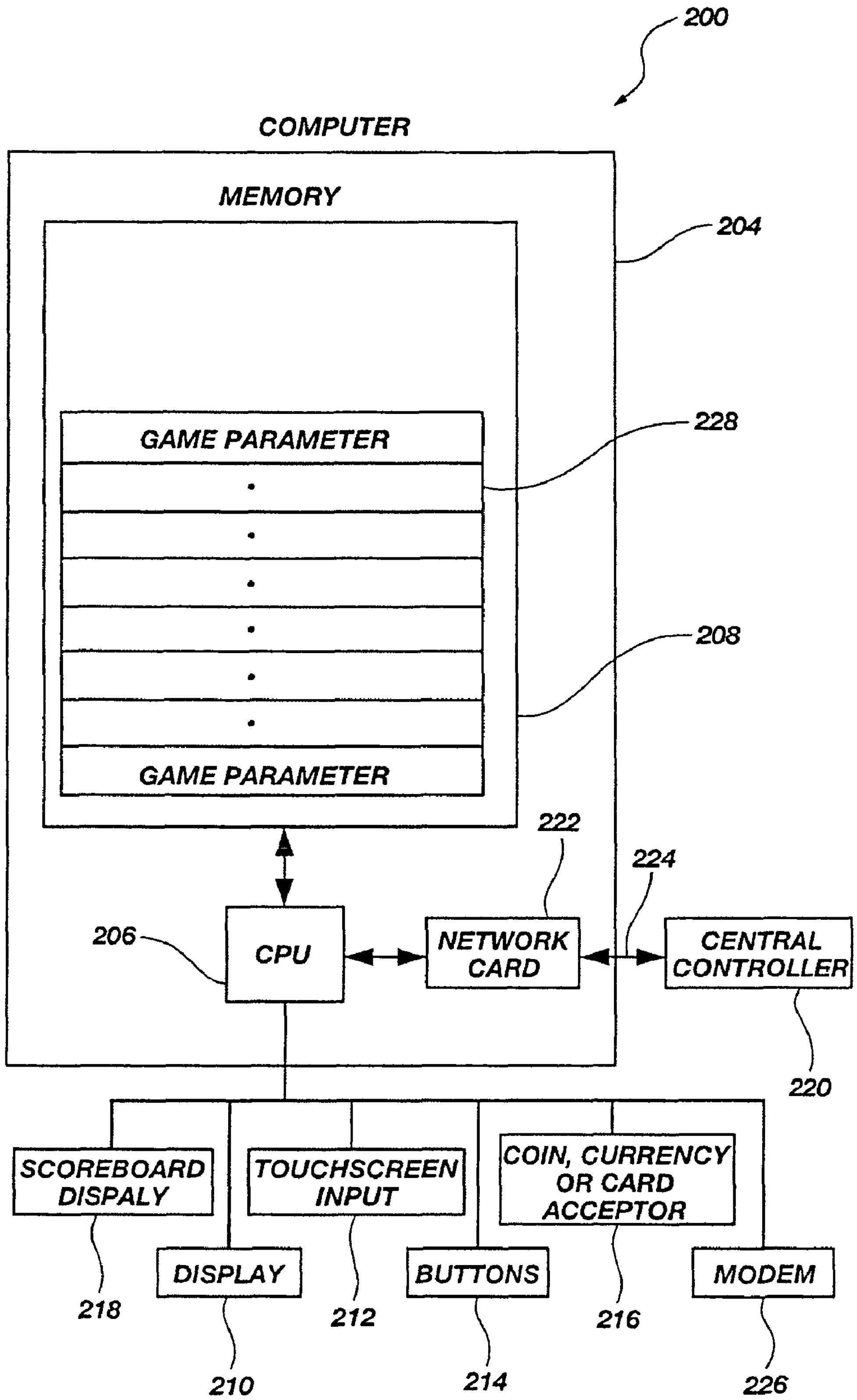
Fig. 1 (PRIOR ART)
FIG. 1 is a schematic of a conventional, prior art electronic gaming machine.
Figure 2:
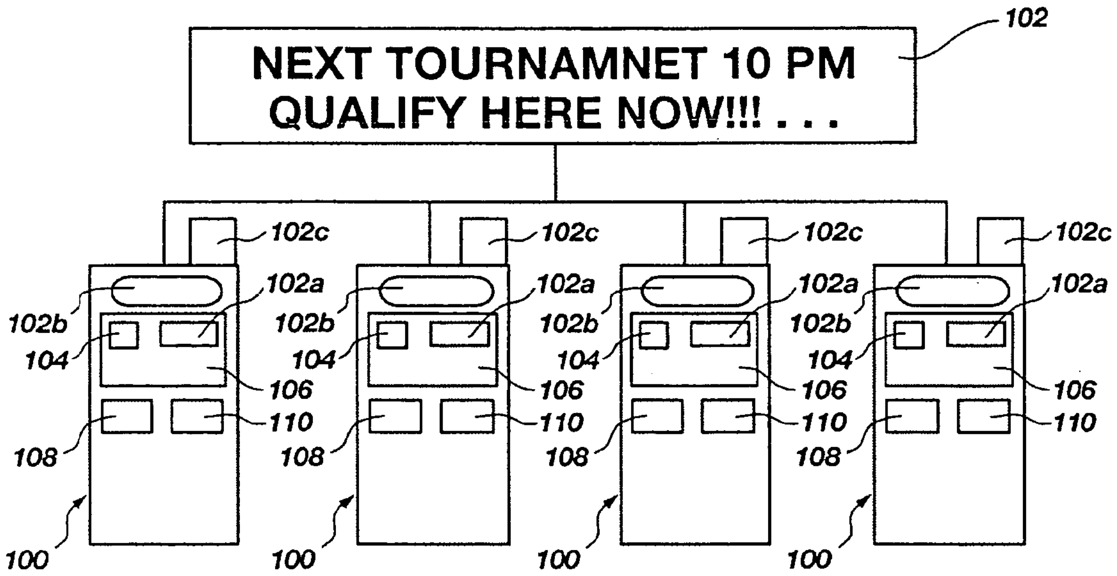
FIG. 2 is a diagram of a plurality of gaming machines arranged in a bank and having a tournament display associated therewith according to the invention.

According to an embodiment of the present invention and as described with respect to FIG. 2, a bank of gaming machines 100 are in communication with a tournament display 102 located thereabove. Gaming machines 100 may include some or all of the features of conventional gaming machines 200 as described above with respect to FIG. 1, modified and augmented as set forth herein.

When the tournament mode of play of the gaming machines 100 is inactive, the tournament display 102 is programmed to show promotional information regarding impending tournaments. The base, or primary, game on each of gaming machines may be, for example, a multi-line, five reel spinning reel game, either electromechanical with actual moving reels or electronic with simulated reels and movement thereof, the game awarding prizes when specified numbers, types and configurations of symbols, also termed elements, occur on a winning payline or otherwise visibly displayed in a winning pattern. Alternatively, the primary game may comprise any other reel-type game, card game, or other game of chance susceptible to representation in an electronic or electromechanical form.

In any case, a special symbol or element on one or more of the reels (or otherwise displayable if other than a reel-type game), sometimes referred to herein for convenience as a "tournament symbol", may be associated with entry into a tournament. For each symbol that appears on a winning payline or other predetermined display location, one or more tournament entry points, also termed tournament bonus credits herein, may be accumulated in a "pool meter" programmed to accrue tournament bonus credits toward eventual qualification for tournament play. By way of example only, tournament bonus credits or entry points may accrue as a multiplier of a bet on a winning payline of a reel type game. When a predetermined number of bonus tournament points has accrued in the pool meter associated with a particular gaming machine, the player at that machine is then tournament-qualified.

When a predetermined period of time has passed, for example, twenty minutes, any players then being qualified for tournament play are queried through a dialog box 104 on each display screen 106 or otherwise readily visible to the player on the face of each gaming machine 100 as to whether they wish to enter the next tournament. Alternatively, the players may be automatically entered in the next tournament, and advised of such entry through the dialog box 104 and, optionally, an audio signal (trumpet blast, bells, music, etc.). In any case, when the player is entered in the tournament, the entry points or tournament bonus credits required for entry to that tournament are deducted from the accrued pool of points or credits at the gaming machine 100, which enters a tournament mode shortly before commencement of a tournament. If desired, a countdown clock may be provided on display screen 106 to prompt the player to a state of readiness for tournament play during the last, for example, two minutes prior to initiation of a tournament. The gaming machines 100 of the bank of machines may be programmed to enter a single or first tournament mode, or may be programmed to enter one of several different tournament modes as dictated by the casino or tournament sponsor. For example, a second or grand tournament mode may be opened, for example on a daily basis, only to players who are identified as prior tournament winners of tournaments conducted in the first tournament mode. Another alternative is to periodically, or when desired, open certain tournaments to gaming machines in other banks on the casino premises (such as all banks in a casino) or in other casinos (such as in affiliated casinos), or gaming machines located in a single city (Las Vegas, Reno) or statewide (Nevada), such as in a wide area progressive format. A series of tournaments may be conducted to enable players to attain a very high tournament point total associated with a very large top tournament award, so as to stimulate player interest in frequent qualification for tournament play. Of course, the grand tournament concept may be combined with the linked banks of machines concept so that, for example, tournament winners throughout the state of Nevada on a given day are entered in a grand tournament at 10 P.M. each evening. Further, the foregoing linked gaming machine concept is not limited to banks, or groups of machines, but may be effectuated by linking gaming machines distributed through a single property such as a casino or a number of properties. With state of the art video displays and accompanying audio, the look and feel of "group" tournament play may readily be simulated at individual machines not grouped as a bank It is currently preferred that gaming machines 100 according to the invention include video displays rather than electromechanical displays to facilitate transitioning from a base or primary game to one or more tournament games. In the illustrated embodiment, the game displayed on gaming machines 100 in at least one tournament mode is similar to the primary game, but with certain differences to distinguish it therefrom. For example, if the primary game is the aforementioned five reel game displayed electronically on a video screen, the tournament game may also comprise a five reel display using different reel symbols and distinguishing surrounding graphics. In addition, the payback rate or payout ratio may be the same as that of the primary game or much higher such as, for example, in excess of one hundred percent. The previously-referenced tournament symbol may also be displayed on the reels during tournament play, in this instance to be used, for example, as an award enhancer. Play in the tournament mode neither deducts wager credits from or adds award credits to the credit meter 108 on each gaming machine 100 entered in the tournament. Instead, and again by way of example only, the tournament mode runs in an all-paylines-bet mode and posts awards earned in tournament play to a special tournament points meter display 110. If desired, the credit meter 108 may also be used as the tournament points meter display while a tournament is being conducted, the credit meter total being accessible responsive to a player prompt such as a touch pad for triggering the credit display momentarily rather than tournament points. The tournament may have a specified duration, for example ten minutes, conclude when the first tournament player reaches a designated tournament point award threshold, or conclude after a specified duration even if no player has reached the designated threshold so as to free the gaming machines for regular, non-tournament play.

During tournament play, the player's tournament points are, as previously noted, displayed on display 110 at his or her gaming machine 100. At the end of a given tournament, the winner or winners are determined and their winnings posted back to the credit meter 108 at each winner's gaming machine 100, unless a progressive jackpot is offered, as described further below, in which instance the award may be paid by an attendant.

Tournament awards may be structured, for example, as a plurality of fixed prizes. Each prize is associated with a tournament point threshold; the greater the prize, the higher the associated points threshold. There may also be a token prize awarded to every entrant, or for a nominal tournament point total, so that substantially every entrant wins something.

Optionally, and as referenced above, the top tournament award may comprise a progressive jackpot. The progressive jackpot is established at a desirable level and is augmented with every tournament session played until it is won. If multiple players reach the threshold level for the progressive jackpot in the same tournament, then the jackpot may be split equally among them, or the entire progressive jackpot awarded to the first player to reach same.

In addition to the foregoing tournament awards, a winner-take-all pool, funded by a percentage of the entry points of each entrant into the tournament, may be provided. If so, the player accruing the greatest amount of tournament points during tournament play is awarded the winner-take-all pool.

When a tournament is ready to commence, players having at least twice the required tournament bonus credits or entry points may be provided with the option to place a single tournament entry or multiple entries. If the latter is chosen, the fixed awards and the winner-take-all pool, if offered, are multiplied by the number of entries placed if that player wins an award. If a progressive jackpot is offered, the progressive award is not multiplied by the number of entries by a given player but, instead, if there are multiple progressive winners, a player with multiple entries wins multiple shares of the progressive, equivalent to the number of entries. For example, if there are three progressive winners but one winner has placed two entries, that player receives two shares instead of one, or one-half the progressive award.

The tournament display 102 may be used for various purposes before and during tournament play. For example, the available awards and their associated tournament point thresholds or other conditions may be displayed between and during tournaments. As a tournament is running, the current tournament leaders as well as a countdown clock with remaining tournament time may be displayed. For example, the accrued points for the players accruing the most tournament points (for example, the top five players) may be displayed on the tournament display 102 in substantially real time to show current tournament status against the clock.

Depending upon the locations of gaming machines configured for tournament play according to the present invention, a tournament display 102 may comprise one or more separate devices apart from the gaming machines 100 or, optionally, may be incorporated into each machine in addition to or in lieu of a separate, discrete tournament display. For example, the tournament display may comprise a segment 102*a* of a main game display 106 or comprise a separate display 102*b* either built into the chassis of the gaming machine 100 or an add-on display 102*c*. Display of promotional information for the tournament may optionally be displayed while the tournament is not running, as may the time or times of subsequent tournaments. Similarly, accrued tournament entry points or bonus credits may or may not be displayed between tournaments, and accrued tournament points and/or player standings may or may not be displayed during tournaments.

According to one currently preferred embodiment of the invention, a tournament event feature is incorporated within a traditional video reel type gaming machine in addition to a base or primary game. Play at a plurality of gaming machines, which may be distributed over a wide variety of locations at the same or different properties, is linked to and monitored by one or more computers, optionally including a dedicated tournament controller, through a network system. Play of primary or base games at the plurality of gaming machines is employed to fund payouts for a tournament enabled for play by qualified players at linked gaming machines (i.e., a predetermined percentage of bets tendered at the gaming machines in primary game play is allocated for tournament payouts). No separate entry fee or buy in for tournament play is employed.

The linked gaming machines are provided with features which “qualify” players into a scheduled, linked, tournament event. Tournament qualification is enabled by attaining one or more game outcome events, such as lining up special symbols or accumulation of game results to meet one or more threshold criteria. Normally, a player may qualify into the next-in-time scheduled, linked, tournament event. However, a player may be provided the option, once qualification parameters are met, to defer tournament play to a future tournament event in certain circumstances. By way of example only, a player may not have sufficient time available to wait for the next in time tournament, or has insufficient time to stay through the duration of the upcoming tournament. Such may be the situation in the case of a bus junket to a tournament, where players only have a finite time during which to play. In such instances, a tournament-qualified player may be provided the option of printing a tournament entry ticket from the gaming machine at which he or she qualified, that allows the player to return to a linked gaming machine to participate in a future tournament session.

In tournament play according to this embodiment of the invention, each linked gaming machine generates game results based on a fixed number of reel spins associated with the duration of the tournament. The reel spins are part of a secondary event within the main game (i.e., the primary game) comprising the aforementioned video or mechanical reel machine. During a tournament session or event, the secondary event accumulates tournament points based on reel combination outcomes. The accumulated tournament points for each player may be displayed at his or her gaming machine in real time. Optionally, the accumulated tournament points for all players at a bank of gaming machines during a tournament session may be displayed on a tournament display associated with the bank or on each gaming machine. If the tournament is comprised of play at gaming machines distributed throughout different areas of a property or even different properties in the same or different town or county, for example, rather than consolidated with a bank of machines, only an individual player’s accumulated tournament points total may be displayed. To stimulate a sense of tournament competition, however, a selected number of other players’ accumulated tournament points may also be displayed on each gaming machine of a number of gaming machines linked for tournament play, for example the accumulated points of the top five or ten players. Another option is to display point totals of all players in a tournament session, and yet another option is to display a particular player’s points and his relative, ranking among all the players in a tournament session. A multiple player points or ranking display may be displayed in real time, at intervals (for example, every three minutes), or at the conclusion of a tournament session.

At the end of a tournament event, the linked gaming machines may each report to a central monitoring computer, such as the aforementioned tournament controller. The tournament controller then determines if each player meets criteria for an additional payout in the form of a progressive amount accumulated from the gaming machines during play of primary games or other additional awards based on accumulation of previous bets tendered at all linked gaming machines. Depending upon game outcomes in tournament play and the number of participants, payout awards are established and displayed on each gaming machine or through meter displays associated with a bank of gaming machines.

A number of payout options are contemplated for the first embodiment of the invention. For example, a standard progressive format may be employed, wherein each player who earns tournament points above a predetermined threshold is paid from the progressive pool funded from the primary game wagers. Another alternative is to tally the total buy-in for a given tournament and spread top tournament awards among entrants to the tournament, thus guaranteeing a fixed percentage of payout to those qualified entrants participating in that tournament. Still another alternative payout approach is to set a fixed amount for all awards triggered for tournament point accrual above a predetermined threshold and a pool for a top award given to the player with the highest point accumulation for that particular tournament session.

If desired, the fixed tournament awards may be set at multiple levels tied to tiered tournament point levels. This may be effectuated by generation of the payout schedule by the tournament controller and transmission thereof back to the linked gaming machines after registration of all players for a tournament session. Such an approach permits the winning pool to fluctuate, an increased number of participants in a given tournament enabling higher as well as more numerous payout awards.

This embodiment of the invention may also incorporate a linked progressive wherein the very highest award is triggered by attaining an extremely high value of points during linked tournament play. This top progressive award may be set to correspond to a tournament point total requiring several rounds of tournament play before being paid out. Such a progressive may be enabled through a wide area progressive (WAP), multi-property linked progressive which may reach very large top payout amounts, thus attracting greater interest for players in qualifying into the linked tournament events.

As noted previously, the present invention may be implemented with a bank of gaming machines at a single location, or to gaming machines in multiple banks or otherwise distributed over a wide area, either within a single property or at multiple sites. A stand-alone gaming machine may also be configured for play in a tournament mode according to the present invention.

While it has been suggested previously that the tournament game be the same as, or similar to, the primary game, it will also be understood by those of ordinary skill in the art that the tournament game may be totally different than the primary game. For example, the primary game may be selected to be a reel-type game, while the tournament game may be selected to be a card game (poker, blackjack, etc.).

There are many alternative approaches to qualification for tournament play according to the invention. Typically and desirably, qualification for tournament play may be related to a game outcome of the primary or base game. For example, a winning outcome of a single game might result in one or more tournament entries or, as noted above and currently preferred by the inventors herein, winning outcomes may be programmed to contribute tournament bonus credits or entry points accrued on a pool meter against a specified threshold requirement for tournament entry. Other alternatives include basing tournament entry on cumulative amounts wagered, such as for example over a predetermined period of time, or the number of qualifying primary games played. In any of the foregoing instances, the gaming machine may be programmed to either clear tournament bonus credits or entry points if the player leaves the machine or, alternatively, be banked to permit additions thereto during future play. Of course, known player identification and "tracking" techniques as previously described herein with respect to the state of the art may be employed to enable a player to "transport" earned tournament bonus credits or entry points to later augment by play of a primary game at the same or another similarly configured gaming machine.

One or more of a plurality of criteria may be selected to initiate tournament play, including initiation at regular intervals (trigger a tournament one half hour after conclusion of the last), according to a specific schedule (every hour on the half hour), according to the number of qualified players (when fifty players accrue sufficient entry points), or randomly throughout the day. On a stand-alone gaming machine, tournament play may be automatically initiated when entry criteria, such as accrual of sufficient tournament entry points, are met.

As noted above, a player may be automatically entered in a tournament when qualified, or may be permitted to accrue additional tournament entry points, for example to place multiple entries in a single, subsequent tournament.

If a multiple entry format is permitted in tournament rules, such may be effectuated in various ways. One approach would be to program a gaming machine to display multiple games, each, for example, being a miniaturized video display of the tournament game. If multiple entries for a single game entry are permitted, then the tournament awards may be may be adjusted to reflect the multiple entries. This approach might involve enhancing the award amounts for multiple entries or, conversely, adjusting tournament point thresholds or other award-triggering criteria in favor of the multiple entrant. Yet another approach is to adjust the tournament game itself to accommodate multiple entries. For example, different award amounts may be provided, different reel strips displayed in the case of a reel-type game or a different card set offered in the case of a card-based tournament game, or multiple entrants may play for different award categories than single entrants. The additional award categories may be fashioned in a manner similar to a well known concept termed "buy a pay". Still another approach to accommodating multiple game entries in an advantageous yet fair manner is to offer a multiple entrant additional tournament play time during which to accrue tournament points or meet other winning criteria. Finally, a casino or other tournament sponsor might provide a sum of free tournament points responsive to a player placing multiple entries. Of course, combinations of various of the foregoing features may be effectuated, as desired, to enhance the entertainment value of the tournament for multiple entry players.

Of course, if multiple entries are not part of the planned tournament game structure, then the player who "over accrues" tournament entry points or bonus credits might be accommodated by being permitted to bank the excess points or credits against future tournaments, might be paid in cash or monetary credits for the excess, of the points may simply be forfeited.

Similarly, one must consider the situation when a player, for any reason, wishes to leave a gaming machine when there are tournament entry points or bonus credits on the pool meter which have not been used to enter a tournament or a tournament entry not placed with them, or if there are simply not enough points to qualify for tournament play. These tournament entry points or bonus credits might be left on the gaming machine for the next player, converted to a cash award, tendered as credits in the primary game to either qualify for a tournament or cash award or lose them, or the machine may simply be reset to zero upon the player's departure.

Once initiated, a tournament may be of fixed or variable duration, be based upon playing a specific number of games or "wagering" a specific number of "credits". For example, the duration of tournament play may be determined by the players being allowed to play off a specific, assigned number of "credits" in the form of "funny money" provided for tournament play for a given session. These "credits" are not augmented by "points" won during tournament play. This approach permits players to vary wagers during tournament play or to use some wagering strategy, whether real or perceived, in tournament play. With a format involving either a number of games played or a number of credits provided to wager, there may, of course, be an override factor in terms of limiting a tournament to a set duration of time.

A wide variety of tournament awards types and conditions for triggering awards may be utilized, including combinations of multiple types. For example, awards may be issued against fixed conditions, independent of results achieved by other tournament players. Alternatively, players may mutually compete to attain the highest tournament point total. Similarly, tournament awards may comprise fixed amounts, progressive amounts, or pari-mutual amounts. As mentioned above, multiple entries per player may be permitted, in which instance award amounts may be adjusted in various ways to ensure fairness to the multiple-entry player. As noted above, tournament awards may be structured so as to provide for at least a nominal award for each tournament entrant, if desired. Awards may be posted to a pool meter at a player's gaming machine or, particularly in the case of larger awards, may be paid by an attendant.

Rather than setting a single tournament entry point or bonus credit total, different levels or tiers of tournaments may be contemplated. In such a case, a player may be permitted to accrue entry points beyond an initial first-tier tournament by, for example, opting-out of the first tournament qualification when first attained or when the tournament next following attainment of the required entry point total. A second-tier tournament may require a higher entry point total and thus offer larger awards.

Further, rather than structuring tiers of tournaments according to entry point totals, a casino or other tournament sponsor may structure higher, or grand, tournament awards, based upon the highest accrued totals of tournament points over a given period, such as a day or a week. With such an arrangement, the accrual of tournament points by a player is monitored by the player's tracking account. Another approach is to accrue tournament points by gaming machine, so that "lucky" machines would attract ever-greater play during a given period, the grand tournament award being reached by whatever player is in the "hot seat" at the machine when either a set total is reached or a highest total among a plurality of machines linked for tournament play.

There may be, of course, one or more sources of funding for a tournament. One alternative is to assign a per-tournament entry point or bonus credit value, the value to be assigned to the tournament funding pool. Another alternative is to allocate a percentage of the amounts wagered in the base or primary games used to qualify for tournament play to the tournament funding pool. Yet another alternative is to independently fund the tournament from other revenues of the venue or a sponsor associated with the venue. Again, combinations of two or more of the foregoing funding approaches may be employed, as desired. Further, the allocation of the tournament funding pool to a between various prizes may be effectuated in a number of well-know manners. For example, the awards may be against fixed odds, a pari-mutuel system may be employed, or a combination thereof.

Figure 3:
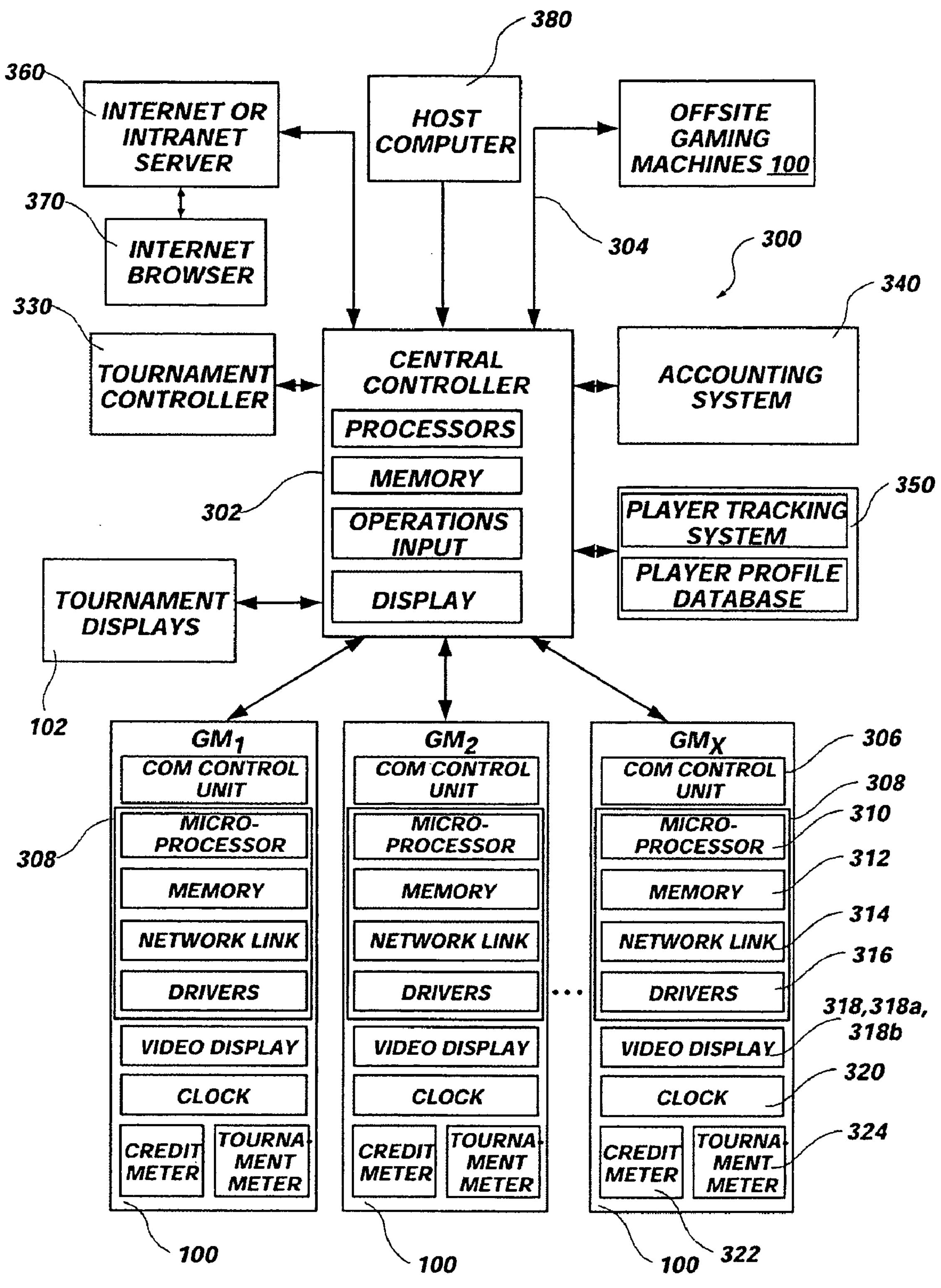
FIG. 3 is a schematic diagram of a configuration in which the plurality of gaming machines and tournament display of FIG. 2 may be incorporated in a host computer-controlled tournament gaming system according to the present invention.

FIG. 3 comprises a schematic of multiple gaming machines 100 linked to a host computer in a manner suitable for implementing a tournament according to the present invention. Tournament system 300 includes a central controller, or host computer 302, operably coupled to a plurality of gaming machines 100 designated as $GM_1$ through $GM_x$. Gaming machines 100 may comprise a single type of machine (e.g., reel-type or card game type), multiple types of machines, or includes multi-game machines as known in the art. Central controller 302 links the plurality of gaming machines 100 for tournament play, among other functions, and such linkage is not restricted to gaming machines 100 at a single site, such as a single casino. Central controller 302 may optionally, through communications link 304 as known in the art, serve gaming machines distributed throughout a number of properties at different geographical locations including, for example, different locations within a city or different cities within a state. It is preferred that central controller 302 be located at the same site as tournament controller 330, although this is not required, given the current, high speed, broadband capabilities of telecommunications links.

Gaming machines 100 each, for example, may include a communications control unit 306 for interfacing each gaming machine 100 with central controller 302. If the gaming machines 100 are of different types and/or of different manufacture, it may be necessary to provide gaming machine-specific interface cards in communications control unit 306.

Each gaming machine 100 also includes a game processor unit 308 operably coupled to central controller 302 through communications control unit 306. Each game processor unit 310 includes a microprocessor 310, memory 312, a network link 314 including a network card and drivers 316. The drivers 316 are, in turn, operably coupled to a video display 318, which may comprise, for example, a cathode ray tube ("CRT"), plasma display, liquid crystal display ("LCD"), and/or a display based on light emitting diodes ("LED"), possibly including a touchscreen input function, as well as to audio outputs for gaming machine 100. Audio outputs may be coordinated with a particular video display sequence, or may be separately initiated. Video display 318 may comprise a plurality of individual display segments 318*a*, 318*b*, etc., located either on a common screen display or on separate displays. Display segment 318*a* would typically comprise the game display, for example, the aforementioned five reel game, while a display segment 318*b* may comprise a tournament display 102. Gaming machines 100 also optionally include a clock 320 for, for example, indicating through video display 318 the time remaining until a tournament or the time remaining in a tournament under way. Alternatively, a timing function may be provided through central controller 302, initiated by tournament controller 330. A credit meter 322 and tournament point meter 324 (for display of tournament entry points and tournament points accrued during a tournament) are also associated with each gaming machine 100. The individual components of the gaming machine as described above, or subcombinations thereof, may also be termed a gaming device.

Tournament controller 330 is operable to initiate tournaments in an automated manner and in accordance with preprogrammed parameters. For example, tournament controller may, and preferably is, programmed to schedule and initiate tournaments, control the length of same (if not concluded based on other criteria such as accrual of a threshold sum of tournament points), implement a tournament paytable or payout ratio distinct from that of a primary game, and provide information to tournament displays 102 (either on gaming machines 100 on a display segment 318*b* or on separate tournament displays 102, for example, associated with banks of gaming machines 100) both between and during tournaments as heretofore described.

It is preferable for security purposes that the overall framework of tournament play for a given tournament be installed into tournament controller 330 (for example, on a CD-ROM) under appropriate security conditions, and that only certain variables not affecting payout ratios such as tournament scheduling and duration be accessible by casino operations personnel for alteration through input/output devices. Within the parameters of a payout ratio set for a tournament, it is, of course, possible to program tournament controller 330 so that casino operations personnel may adjust the number and size of tournament awards and whether, for example, a nominal award will be paid to all entrants. Similarly, the tournament controller 330 may be programmed for administration of a tournament or series of tournaments including a progressive jackpot payout, as well as to run a tournament in a pari-mutuel manner with respect to allocation of tournament funding.

Also linked to central controller 302 in real time is an accounting system 340 and a player information system 350, the two of which may be combined, as desired, in a single system. Accounting system 340 is employed to provide automated, real time accounting for a tournament administered by tournament controller 330 through central controller 302, while player information system 350 provides stored, updated profiles of players with respect to credit status, money wagered, money won, games played, preferred games, etc., such information being updated with an integral player tracking function responsive to a player's smart card or other tracking method.

As should be clear to one of ordinary skill in the art, the foregoing description of a video display may be implemented through a single display, or group of displays housed in a decorative casing or casings comprising the gaming machine chassis and coupled, directly or indirectly, to a common central controller 302 such as through a local area network ("LAN") and/or through a wide area network ("WAN"). With the tournament gaming system 300 as illustrated in FIG. 3, multiple communication lines from the central controller 302 may be coupled to each gaming machine 100 to relay and modify display data in the multiple game display windows or segments. The communication lines may include, without limitation, electronic or other data transferring cable (including optical as well as electrical), radio frequency wave transmissions including cellular frequency transmissions as well as microwave, satellite dish frequencies, etc., phone lines (again both optical and electrical) and the like, such as is common with remote communication systems. More preferably, however, the function and displays on the gaming machine 100 may be fixed by hardware and software included within each gaming machine 100 to minimize required communication with the central controller 302. For example, gaming machines 100 may be programmed with both a primary game mode and a tournament mode, whereby a signal from tournament controller 330 delivered via central controller 302 may initiate a tournament mode as desired and terminate same after, for example, a predetermined elapsed tournament duration or receipt of real time information from at least one gaming machine 100 that a threshold sum of tournament points has been accrued.

The game display and interaction as described herein may also be implemented through an Internet or Intranet server 360 as an Internet or Intranet display to be viewed by at least one Internet browser 370. In this way, connection to a tournament and accumulation of tournament points, may be accomplished with only a connection to the Internet/Intranet server 360 through a conventional phone or other data transmission line, digital signal line ("DSL"), T-1 line, coaxial cable, fiber optic cable, or other connection known in the art. It is will also be understood by those of ordinary skill in the art that enhanced bandwidth of digital wireless communications may render such technology suitable for some or all communications according to the present invention, particularly if such communications are encrypted. It will be further understood and appreciated by those of ordinary skill in the art that higher data transmission speeds may be useful for enhancing the sophistication and response of the display and interaction with the player. Even in an Internet embodiment, the game display may be housed in a decorative housing. One advantage to this embodiment, however, is that players may access an Internet game page from any location where an Internet connection and computer, or other Internet facilitator such as the so-called "WebTV" boxes, are available. The expansion in the number of computers and number and speed of Internet connections in recent years increases opportunities for players to play from an ever-increasing number of remote sites.

Central controller 302 may also be linked to a host computer 380 at the same or another site, host computer 380 controlling, by way of example, the entire computer network of a property or group of properties or another central controller overseeing another group of tournament-capable gaming machines for operating a different type of tournament or a tournament on a different but overlapping schedule with the tournament controlled by central controller 302.

Figure 4:
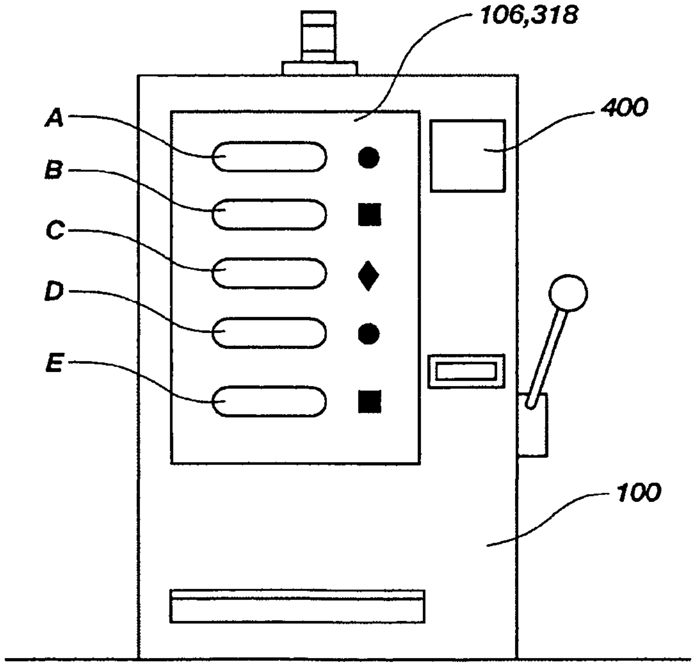
FIG. 4 is a schematic of a multi-game capable gaming machine displaying recent play history and game prize profile icons according to the invention.

In addition to other aspects of the present invention and referring to FIG. 4, a gaming machine may include a display or a display segment 106, 318 including a recent play history 400 for that machine. For example, one or more of the following may be displayed: length of time since last jackpot, size of last jackpot, frequency of jackpots, jackpot trends, or other win information. Depending upon a given player's personality and preferences, a player might be drawn to a given gaming machine because it has not recently paid out and is thus "due to hit", or has paid out in the recent past and is thus on a "hot streak". In addition to primary game outcome information, a gaming machine display might be configured to display a tournament play history so that players might choose a gaming machine which has been "lucky" during tournament play.

Further, it is contemplated that tournament entries may be made from gaming machines exhibiting different primary games, or multiple primary games. Thus, game-specific entry point accumulation criteria associated with different types of games (for example, card games and reel-type games) may be mathematically adjusted so as to be substantially equivalent. In other words, the entry point accumulation criteria would be implemented for different games so play of one game would not be more likely to result in tournament qualification than play of another, different type of game. Such an approach lends itself to multi-game machines which now merely provide the option of playing several different types of primary games. Further, and with reference again to FIG. 4, in a multi-game video gaming machine, "prize profile" icons may be associated with and displayed adjacent each game name A through E on the display. Each game prize profile, such as frequent small jackpots (circle icon), fewer midrange jackpots (square icon) or still fewer large jackpots (diamond icon) is associated with a particular icon. Of course, any type of icon, such as fanciful figures associated with a theme of the casino in which the gaming machine is placed, may be employed Thus, players may quickly come to associate an icon with a type of primary game which appeals to them from a payout standpoint. Of course, the use of prize profile "icons" is readily adaptable to gaming machines lacking a tournament game feature.

The present invention has been described primarily in terms of a game or games of chance, both as to primary game play as well as to tournament game play. However, it is contemplated that the invention may be implemented with a combination of a primary game of skill and a tournament game of chance, a primary game of chance and a tournament game of skill, or a primary game of skill and a tournament game of skill. of course, games of combined skill and chance may also be used as either or both of a primary game and a tournament game.

Although the present invention has been shown and described with respect to preferred embodiments, various additions, deletions and modifications that are obvious to a person skilled in the art to which the invention pertains, even if not shown or specifically described herein, are deemed to lie within the scope of the invention as encompassed by the following claims.

The invention claimed is:

1. A method of operating a gaming system, said method comprising:

allowing game play on one or more of a plurality of gaming devices connected to a central controller over a gaming network;

accumulating, for each of the plurality of gaming devices, tournament bonus credits earned during game play on the respective gaming device;

selecting at least a portion of the plurality of gaming devices to participate in a tournament from the plurality of gaming devices that have accumulated a number of tournament bonus credits based on criteria established only by an operator of the gaming system;

receiving a desired number of tournament entries from the selected gaming devices, wherein the desired number of tournament entries corresponds to a multiple of the required number of tournament bonus credits necessary for participation in the tournament;

decrementing an amount of tournament bonus credits accumulated for each of the selected gaming devices from which at least one tournament entry is received;

initiating a tournament mode of play on the network for the selected gaming devices;

transmitting a signal over the network to each of the selected gaming devices indicating that the gaming device is selected for the tournament mode of play;

starting the tournament mode of play at a starting time;

tracking game play that occurs on the selected gaming devices after the starting time as tournament game play;

compiling tournament game play as tournament data;

displaying the tournament data substantially in real-time as it is collected; and ending the tournament after a player of one of the selected gaming devices achieves predetermined game results.

2. The method of claim 1 wherein displaying the tournament data comprises displaying leaders of the tournament game play.

3. The method of claim 1 wherein displaying the tournament data comprises displaying the tournament data on a device separate from the plurality of gaming devices.

4. The method of claim 1 wherein the starting time begins at a pre-scheduled time.

5. The method of claim 1 wherein the starting time begins at a random time.

6. The method of claim 1, wherein ending the tournament comprises ending after a player accumulates a predetermined number of points.

7. The method of claim 1, further comprising awarding an award to the player who achieves the predetermined game results.

8. The method of claim 7 wherein awarding an award comprises an attendant paying the award.

9. The method of claim 7 wherein awarding an award comprises crediting a meter on a gaming device associated with the player who achieves the predetermined game results.

10. A method of operating a gaming system, said method comprising:

allowing game play by players on one or more of a plurality of gaming devices connected to a central controller over a gaming network;

accumulating, for each of the plurality of gaming devices, tournament bonus credits earned during game play on the respective gaming device;

selecting a group of the playing devices to participate in a tournament from the plurality of gaming devices that have accumulated a number of tournament bonus credits, the selection made without consideration of player desire to participate in the tournament;

receiving a desired number of tournament entries from the selected gaming devices, wherein the desired number of tournament entries corresponds to a multiple of the required number of tournament bonus credits necessary for participation in the tournament;

decrementing an amount of tournament bonus credits accumulated for each of the selected gaming devices from which at least one tournament entry is received;

generating a signal on the network that identifies at least one of the gaming devices in the group selected to participate in the tournament;

transmitting the signal to the identified at least one gaming device;

starting the tournament at a starting time;

tracking game play that occurs on the selected gaming devices after the starting time as tournament game play;

compiling tournament game play as tournament data;

displaying the tournament data substantially in real-time as it is collected; and ending the tournament after a player of one of the selected gaming devices achieves predetermined game results.

11. The method of claim 10 wherein the starting time begins at a pre-scheduled time.

12. The method of claim 10 wherein the starting time begins at a random time.

13. The method of claim 10, further comprising awarding an award to the player who achieves the predetermined game results.

14. The method of claim 13, wherein awarding an award comprises crediting a meter on a gaming device associated with the player who achieves the predetermined game results.

15. A gaming system managed by a system operator, said gaming system comprising:

a plurality of gaming devices coupled to a gaming network; and a tournament controller on the gaming network including:

an accumulator for each of the plurality of gaming devices structured to accumulate tournament bonus credits earned during non-tournament game play on the respective gaming device;

a selection mechanism under sole control of the system operator and structured to select one or more of the gaming devices from the plurality of gaming devices that have accumulated a number of tournament bonus credits to participate in a tournament based on criteria established by the system operator, an input device structured to receive a desired number of tournament entries from the selected gaming devices, wherein the desired number of tournament entries corresponds to a multiple of the required number of tournament bonus credits necessary for participation in the tournament;

a decrementor structured to decrement an amount of tournament bonus credits accumulated for each of the selected gaming devices from which at least one tournament entry is received;

a tournament enroller coupled to the selection mechanism and structured to generate a signal for the selected gaming devices based on an output of the selection mechanism, a tournament initiator structured to, at a tournament starting time, send the signal to the selected gaming devices, a tournament tracker configured to track game play that occurs on the selected gaming devices after the starting time as tournament game play, a display coupled to the tournament tracker, and means for ending the tournament after results of the game play match predetermined results.

16. The system of claim 15, further comprising a processor coupled to the tournament tracker, the processor adapted to generate tournament data to be shown on the display.

17. The system of claim 16 wherein the tournament data comprises tournament leaders.

18. The system of claim 15 wherein the display is a device separate from the plurality of gaming devices.

19. The system of claim 15, further including a time scheduler that allows the system operator to choose a starting time.

20. The system of claim 15 wherein the tournament controller further comprises an award mechanism configured to award a tournament award to a winner of the tournament.

21. The system of claim 20 wherein the award mechanism comprises a machine credit generator.

* * * * *